July 23, 1968     HANS-KARL DAUR     3,393,536
DEVICE FOR CENTERING TWO SHAFTS OF A FLEXIBLE COUPLING
Filed May 27, 1966
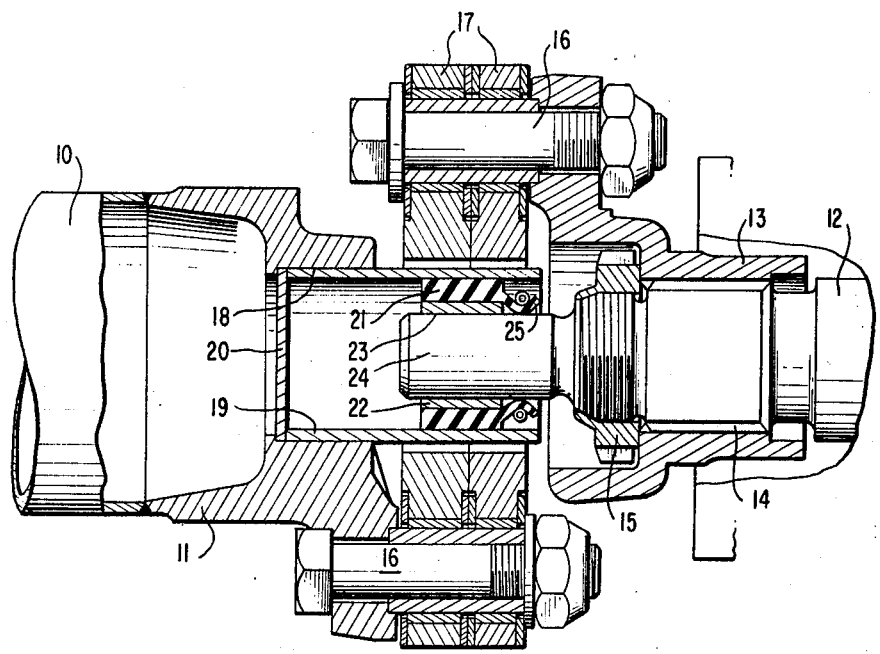
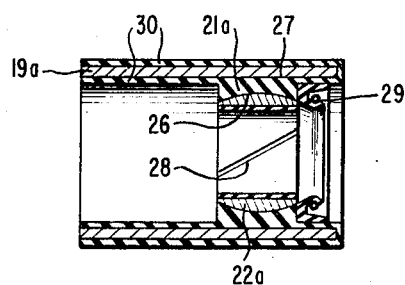
INVENTOR
HANS-KARL DAUR

United States Patent Office 3,393,536
Patented July 23, 1968

3,393,536
DEVICE FOR CENTERING TWO SHAFTS OF A FLEXIBLE COUPLING
Hans-Karl Daur, Stuttgart-Bad Cannstatt, Germany, assignor to Daimler-Benz Aktiengesellschaft, Stuttgart-Unterturkheim, Germany
Filed May 27, 1966, Ser. No. 553,497
Claims priority, application Germany, June 2, 1965, D 47,415
25 Claims. (Cl. 64—13)

ABSTRACT OF THE DISCLOSURE

A centering device disposed between the two shaft ends of a flexible coupling, wherein the device prevents a radial displacement of the two shaft ends with respect to each other while permitting slight axial displacements as well as bending up to a limited angle.

BACKGROUND OF THE INVENTION

With a known centering device of the aforementioned type, the cylindrical sleeve is constructed as cast part with comparatively large wall thickness and is secured at the flange of the one shaft end by means of a cost-on flange. A metallic bushing is arranged within the sleeve which is axially supported, on the one hand, at a collar provided on the sleeve end facing the other shaft and, on the other, at a coil-shaped prestressed compression spring which, in turn, is supported at a ring secured at the other sleeve end. Within the bushing constructed of spherical shape along the inner wall thereof, there is arranged a metallic gliding part consisting of two half-rings and constructed externally of spherical shaped corresponding to the aforementioned inner wall of the bushing, which gliding part surrounds the pin-shaped end of the other shaft and centers the same.

This known centering device is, however, very disadvantageous in its conception. It is characterized by large costs in expensive individual parts, which have to be machined accurately, and has—in particular, by reason of the spherical construction of the sleeve—comparatively bulky and large dimensions, combined with a corresponding weight. A further disadvantage of the known centering device consists in that a servicing thereof can be avoided only at very high costs, for example, by the selection of wear-resistant bearing metals and by very accurate sealing of the bearing places in order to prevent a flowing out or escape of the lubricant. Furthermore, the prior art centering device entails the considerable disadvantage that a metallic bridge is formed between the two shafts by the structural parts thereof so that vibrations and noises connected therewith are transmitted from one shaft to the other. With the use of the prior art centering device, for example, between the transmission-joint shaft, rear axle units in motor vehicles, strong transmission noises can reach the vehicle body and therewith the passenger space.

SUMMARY OF THE INVENTION

The present invention now aims at avoiding all of the aforementioned disadvantages and therebeyond to achieve further advantages to be described more fully hereinafter. The present invention proposed as solution to this problem that the cylindrical sleeve is constructed of tubular shape and consists of comparatively thin-walled material, for instance, of drawn or similar material, that the sleeve is secured in an axial cylindrical aperture of the respective shaft flange, that a layer of rubber or technically equivalent material is arranged non-displaceably and non-rotatably at the inner wall of this sleeve, within the sleeve as elastic bearing support for the other shaft, and that an essentially tubularly shaped gliding part of the accommodation of the pin-shaped end of the other shaft is arranged at the inner wall of this layer, under prestress thereof.

The cylindrical sleeve in accordance with the present invention is now of very light weight compared to the corresponding relatively heavy cast sleeve of the prior art because it is made, on the one hand, of a material with greater strength and therefore can be constructed thin-walled and, on the other, because it is not provided with a flange which signifies also a considerable saving in structural length, which now can be utilized appropriately for a wider and possibly subdivided construction of the shaft plate. The securing of the sleeve in the aperture of the one shaft flange can be realized in principle in any known manner, for example, by welding, screwing, or shrinking.

Furthermore, the considerable advantage of a noise insulation and vibration damping is achieved by the rubber layer in accordance with the present invention. Therebeyond, the rubber layer, by reason of its elasticity and damping properties, prevents far-reachingly damages of the bearing surfaces of the pin and gliding part in case of shock action and impacts on the shafts.

The gliding part made of conventional plastic material in accordance with the present invention, though of course also other materials or material compositions may be used such as, for example, steel lined with any known suitable synthetic plastic material, preferably Teflon or Teflon fabric, or also frictionless rubber, offers above all the advantage of complete freedom from servicing because now no lubrication of the corresponding contact surfaces with the shaft pin is necessary. The gliding part may be composed, as known per se, of two half rings. Preferably, however, the present invention proposes that the gliding part is constructed in one-piece, i.e., as an integral unitary part. This means advantageously, on the one hand, a more simple manufacture thereof and on the other, such a gliding part exhibits a better form rigidly with respect to the softer surrounding rubber layer.

However, with the constructional dimension and realization of the rubber layer, one must always aim at such a rigidity thereof that possible radial deflections of the gliding part of the shaft pin disposed therein are immediately absorbed and the shafts are returned to the concentric position thereof. This is appropriately achieved by a matching of wall thickness and of the Shore-hardness of the rubber layer. Also of influence are thereby, of course, the dimensions in length of the layer. Thus, for example, the entire inner wall of the sleeve may be covered by the rubber layer.

However, the present invention preferably proposes that the length of the rubber layer amounts to about a third of the sleeve length and that the rubber layer is secured, in a known manner, at the sleeve inner wall and at the outer wall of the gliding part. Such a relatively short rubber layer favors a limited bending or angular movement of the two shaft ends and therefore coresponds advantageously to the requirements posed hereinabove. A further improvements of the bending ability is achieved according to another feature of the present invention in that the inner wall of the rubber layer and correspondingly the outer wall of the gliding part are constructed of spherical shape.

The securing of the rubber layer between the inner wall of the sleeve and the outer wall of the gliding part may take place in any known manner, for example, by bonding or gluing. However, the present invention prefers a vulcanizing, in situ, of the rubber layer. This process additionally permits advantageously to install the rubber layer under prestress as indicated above. A prestressed rubber layer assures a play-free bearing support of the shaft pin in the gliding part by compressing the rubber layer whereby the gliding part—according to a still further feature of the present invention—may be constructed with a straight slot continuous or uninterrupted in the longitudinal direction. As a result of this measure, a play-free centering of the shaft pin may be achieved even when the bearing surfaces thereof already exhibit some wear.

Another preferred embodiment of the present invention provides that the gliding part is provided with a helically shaped slot extending continuously or uninterruptedly in the longitudinal direction. Such a slot construction offers the advantage that it permits only slight widening or enlargement of the gliding part on the side of the shaft pin under loads of the same.

In order to assure a long length of life of the centering device of the present invention, it is necessary that the penetration of dust, water, and other soiling particles and impurities is prevented at the bearing places. Accordingly, the present invention proposes in that connection that the sleeve is closed at the end facing the securing flange and that a ring shaped seal is arranged at the open sleeve end—between the sleeve inner wall and the shaft pin—which seal is axially effective to both sides. The seal may be constructed, in principle, in the manner of the customary, conventional packing rings and may be arranged correspondingly as separate structural part between the two aforementioned parts. However, the present invention preferably provides that the seal is constructed in the manner of a ring with V-shaped cross section and that this seal is vulcanized onto the rubber layer. Of course, a fastening of the seal at the rubber layer by bonding, gluing or the like also falls within the scope of the present invention.

In addition to a protection of the interior parts against soiling and damage, it is of utmost importance to protect also externally against damage, especially from corrosion the parts of the centering device which are exposed constantly against the influences of dampness, moisture and road dust—particularly with the use thereof between transmission and joint shaft in motor vehicles below the vehicles floor thereof. Consequently, the present invention proposes in that connection that the sleeve is covered externally as well as internally with a relatively thin rubber layer serving as corrosion protection. This measure requires no separate operation but is to be appropriately realized simultaneously with the vulcanizing of the aforementioned rubber layer. Of course, additional protective coatings of conventional type may also be provided prior to the vulcanizing of the rubber layer.

Accordingly, it is an object of the present invention to provide a shaft centering device of the type described above which is simple in construction yet eliminates effectively all of the aforementioned shortcomings and drawbacks encountered with the prior art constructions.

It is another object of the present invention to provide a shaft centering device which not only is more simple in construction than the prior art devices of similar type but avoids both heavy as well as costly parts while simultaneously achieving improved operating characteristics.

Another object of the present invention resides in a centering device for two shaft ends which requires absolutely no servicing without the need for expensive and accurately machined parts.

Still another object of the present invention resides in a centering device for the shaft ends of a motor vehicle shaft, normally found below the vehicle floor between transmission and driven vehicle wheels, which is so constructed and arranged as to avoid metal-to-metal contact in order to minimize the transmission of vibrations and noises to the vehicle body.

A further object of the present invention resides in a shaft centering device of which the parts may be readily manufactured, utilizing relatively inexpensive materials without sacrifice to the effectiveness thereof for the intended purposes.

Another object of the present invention resides in a centering device for the shafts of a motor vehicle shafting which is protected effectively against all external influences that may lead to premature wear and tear.

A still further object of the present invention resides in shaft centering devices of the type described above which not only eliminate play in the connections between the shaft ends but automatically compensates for wear in the gliding parts of such connection.

BRIEF DESCRIPTION OF THE DRAWING

These and further objects, features, and advantages of the present invention will become more obvious from the following description when taken in connection with the accompanying drawing which shows, for purposes of illustration only, two embodiments in accordance with the present invention, and wherein:

FIGURE 1 is an axial longitudinal cross-sectional view through a centering device in accordance with the present invention with the parts thereof in the assembled condition; and FIGURE 2 is an axial longitudinal cross-sectional view through a modified embodiment of a centering device in accordance with the present invention.

DETAILED DESCRIPTION OF THE DRAWING

Referring now to the drawing wherein like reference numerals are used throughout the two views to designate like parts and more particularly to FIGURE 1, a flange 11 is welded to one end of a shaft 10. A flange 13 is non-rotatably secured, by means of a splined connection 14, to another shaft 12, and is axially secured thereon by a nut 15. The flanges 11 and 13 are secured by means of bolts 16 at a sub-divided elastic shaft plate 17 of otherwise known construction which serves as conventional connecting means for the two shafts 10 and 12. A cylindrical sleeve 19 is non-displaceably and non-rotatably arranged within a central, cylindrical aperture 18 of the flange 11. The sleeve 19 is closed off by means of a plate 20 at the end thereof facing the shaft 10. A rubber layer 21 is arranged within the sleeve 19 and a tubularly shaped sliding part 22 of suitable synthetic plastic material of known type is arranged within the rubber layer 21. The rubber layer 21 is securely vulcanized in situ under prestress between the parts 19 and 22. The gliding part 22 receives within a central cylindrical aperture 23, the pin shaped end 24 of the shaft 12 and therewith centers the shaft 12 with respect to the shaft 10. In order to prevent the penetration of dust, moisture, and the like into the bearing place, a sealing ring having a V-shaped cross section is vulcanized onto the rubber layer 21. The sealing ring 25 surrounds the shaft pin 24 and seals the same in the axial direction on both sides.

In the embodiment according to FIGURE 2, the inner wall 26 of the rubber layer 21a and correspondingly the outer wall 27 of the gliding part 22a are constructed of spherical shape in order to permit possibly a facilitated bending or angular movement of the two shaft ends. The gliding part 22a is provided with a helically shaped slot 28 which effects a slight contraction of the gliding part 22a under the prestress of the rubber layer 21a and therewith assures a play-free seating of the shaft pin 24 illustrated in FIGURE 1. A packing ring 29 is provided in this embodiment as seal and is inserted as separate structural part into the sleeve 19a. A thin rubber layer 30 which lines the sleeve 19a externally and internally serves as corrosion-protection for the sleeve 19a. The thin rubber layer 30 is vulcanized to the sleeve 19a at the same time and during the same operation as the rubber layer 21a. Of course, similar thin rubber layers may be provided in an analogous manner with sleeve 19 of FIGURE 1.

While I have shown and described two embodiments in accordance with the present invention, it is understood that the same is not limited thereto but is susceptible of numerous changes and modifications as known to a person skilled in the art and I therefore do not wish to be limited to the details shown and described herein but intend to cover all such changes and modifications as are encompassed by the scope of the appended claims.

I claim:

1. A device for centering two shafts which are connected by means of an elastic shaft plate or the like, comprising flange means at each shaft end, one of the flange means being provided with an axial aperture, relatively thin-walled rigid tubular sleeve means secured in said aperture, tubular prestressed elastic means in the form of a layer of rubber-like material non-displaceably and non-rotatably arranged at the inner wall of said sleeve means, tubular gliding means arranged at the inner wall of said elastic means under prestress of the latter for receiving with axial relative movement a pin-shaped end provided at the other shaft, means closing the sleeve means at the end thereof near said one flange means, and ring-shaped seal means axially effective to both sides and arranged at the opposite open sleeve end engaging the inner wall of the sleeve means and the shaft pin.

2. A device according to claim 1, wherein said axial aperture and said sleeve means are of substantially cylindrical shape.

3. The device according to claim 2, wherein said material is a drawn material.

4. The device according to claim 2, wherein the length of the rubber-like layer amounts to about one-third of the length of the sleeve means, and the rubber-like layer is secured at the inner wall of the sleeve means and outer wall of the gliding means.

5. A device according to claim 4, wherein said gliding means is of unitary construction.

6. A device according to claim 5, wherein the inner wall of the rubber-like layer and correspondingly the outer wall of the gliding means are of approximately spherical construction.

7. A device according to claim 6, wherein the gliding means is provided with a substantially rectilinear slot extending uninterruptedly in the substantially longitudinal direction constituting a split ring construction.

8. A device according to claim 6, wherein the gliding means is provided with a helical slot extending uninterruptedly in the substantially longitudinal direction constituting a split ring construction.

9. A device according to claim 6, wherein said gliding means is provided with a slot extending uninterruptedly in the generally longitudinal direction constituting a split ring construction.

10. The device according to claim 1, wherein the length of the rubber-like layer amounts to about one-third of the length of the sleeve means, and the rubber-like layer is secured at the inner wall of the sleeve means and outer wall of the gliding means.

11. A device according to claim 1, wherein said gliding means is of unitary construction.

12. A device according to claim 1, wherein the inner wall of the rubber-like layer and correspondingly the outer wall of the gliding means are of approximately spherical construction.

13. A device according to claim 1, wherein said gliding means is provided with a slot extending uninterruptedly in the generally longitudinal direction.

14. A device according to claim 1, wherein the seal means is constructed in the manner of a ring having a substantially V-shaped cross section which is vulcanized onto the rubber-like layer.

15. A device according to claim 14, wherein the sleeve means is covered with a rubber-like layer of relatively small thickness on the inside and outside thereof and serving as corrosion protection.

16. The device according to claim 15, wherein the length of the rubber-like layer amounts to about one-third of the length of the sleeve means, and the rubber-like layer is secured at the inner wall of the sleeve means and outer wall of the gliding means.

17. A device according to claim 16, wherein said gliding means is of unitary construction.

18. A device according to claim 1, wherein said one flange means is a rigid integral part of its corresponding shaft, and said pin-shaped end being a rigid integral extension of said other shaft.

19. A device according to claim 18, wherein said ring-shaped seal means is an integral extension of said elastic means.

20. A device for centering two shafts which are connected by means of an elastic shaft plate or the like, comprising flange means at each shaft end, one of the flange means being provided with an axial aperture, relatively thin-walled sleeve means secured in said aperture, elastic means in the form of a layer of rubber-like material non-displaceably and non-rotatably arranged at the inner wall of said sleeve means, gliding means arranged at the inner wall of said elastic means under pre-stress of the latter for receiving a pin-shaped end provided at the other shaft, said axial aperture and said sleeve means being of substantially cylindrical shape, said gliding means being of approximately tubular shape, the length of the rubber-like layer amounting to about one-third of the length of the sleeve means, the rubber-like layer being secured at the inner wall of the sleeve means and outer wall of the gliding means, said gliding means being of unitary construction, the inner wall of the rubber-like layer and correspondingly the outer wall of the gliding means being of approximately spherical construction, said gliding means being provided with a slot extending uninterruptedly in the generally longitudinal direction, the sleeve means being closed at the end thereof near the corresponding flange means, ring-shaped seal means axially effective to both sides and arranged at the open sleeve end between the inner wall of the sleeve means and the shaft pin, wherein the seal means is constructed in the manner of a ring having a substantially V-shaped cross section which is vulcanized onto the rubber-like layer.

21. A device according to claim 20, wherein the sleeve means is covered with a rubber-like layer of relatively small thickness on the inside and outside thereof and serving as corrosion protection.

22. A device according to claim 21, wherein said last-mentioned rubber-like layer is secured to said sleeve means during the vulcanization of the first-mentioned rubber-like layer.

23. A device for centering two shafts which are connected by means of an elastic shaft plate or the like, comprising flange means at each shaft end, one of the flange means being provided with an axial aperture, relatively thin-walled sleeve means secured in said aperture, elastic means in the form of a layer of rubber-like material non-displaceably and non-rotatably arranged at the inner wall of said flange means, gliding means arranged at the inner wall of said elastic means under pre-stress of the latter for receiving a pin-shaped end provided at the other shaft, the sleeve means being closed at the end thereof near the corresponding flange means, ring-shaped seal means axially effective to both sides and arranged at the open sleeve end between the inner wall of the sleeve means and the shaft pin, the seal means being constructed in the manner of a ring having a substantially V-shaped cross section which is vulcanized onto the rubber-like layer, the sleeve means being covered with a rubber-like layer of relatively small thickness on the inside and outside thereof and serving as corrosion protection, the length of the rubber-like layer amounting to about one-third of the length of the sleeve means, the rubber-like layer being secured at the inner wall of the sleeve means and outer wall of the gliding means, said gliding means being of unitary construction, the inner wall of the rubber-like layer and correspondingly the outer wall of the gliding means being of approximately spherical construction.

24. A device according to claim 23, wherein said gliding means is provided with a slot extending uninterruptedly in the generally longitudinal direction.

25. A device for centering two shafts which are connected by means of an elastic shaft plate or the like, comprising flange means at each shaft end, one of the flange means being provided with an axial aperture, relatively thin-walled sleeve means secured in said aperture, elastic means in the form of a layer of rubber-like material non-displaceably and non-rotatably arranged at the inner wall of said flange means, gliding means arranged at the inner wall of said elastic means under pre-stress of the latter for receiving a pin-shaped end provided at the other shaft, the sleeve means being covered with a rubber-like layer of relatively small thickness on the inside and outside thereof and serving as corrosion protection.

References Cited

UNITED STATES PATENTS

| | | | |
|---|---|---|---|
| 1,550,458 | 8/1925 | Schell | 64—13 |
| 1,631,216 | 6/1927 | Leipert | 64—13 |
| 2,154,991 | 4/1939 | Padgett | 64—11 |
| 2,345,564 | 4/1944 | Allen | 308—72 |
| 2,377,469 | 6/1945 | Venditty | 64—11 |
| 2,793,087 | 5/1957 | Hayes | 308—26 |
| 2,953,001 | 9/1960 | Hufstader | 64—17 |
| 3,097,893 | 7/1963 | White | 308—36.2 |
| 3,330,605 | 7/1967 | Jasmand | 308—238 |

FOREIGN PATENTS

| | | |
|---|---|---|
| 1,347,877 | 11/1963 | France. |
| 513,258 | 2/1955 | Italy. |

HALL C. COE, *Primary Examiner.*